(12) United States Patent
Coen et al.

(10) Patent No.: US 6,247,583 B1
(45) Date of Patent: Jun. 19, 2001

(54) CONVEYOR CHAIN FOR TRANSPORTING ARTICLES

(75) Inventors: Daniele Coen, Reggio Emilia; Federica Dotti, Carpi, both of (IT)

(73) Assignee: Rexnord Marbett S.p.A., Correggio-Reggio Emilia (IT)

( * ) Notice: Subject to any disclaimer, the term of this patent is extended or adjusted under 35 U.S.C. 154(b) by 0 days.

(21) Appl. No.: 09/420,542

(22) Filed: Oct. 19, 1999

(51) Int. Cl.[7] ................................................. B65G 17/06
(52) U.S. Cl. ............................................................ 198/852
(58) Field of Search ............................................ 198/852

(56) References Cited

U.S. PATENT DOCUMENTS

| 3,317,030 | * | 5/1967 | Davis | 198/852 X |
| 3,768,631 | | 10/1973 | Wahren | 198/852 |
| 4,893,709 | * | 1/1990 | Schroeder et al. | 198/852 |
| 6,173,832 | * | 1/2001 | Lockayne | 198/852 |

FOREIGN PATENT DOCUMENTS

| 2101049 | 3/1972 | (FR) | B65G/17/00 |
| 2265640 | 10/1975 | (FR) | B65G/17/08 |
| 2380203 | 9/1978 | (FR) | B65G/17/06 |
| 2564810 | 11/1985 | (FR) | B65G/17/38 |

* cited by examiner

*Primary Examiner*—James R. Bidwell
(74) *Attorney, Agent, or Firm*—Quarles & Brady LLP

(57) ABSTRACT

A conveyor chain (1) for transporting articles, which has an unusually continuous bearing surface for the articles, comprises a plurality of links (2), in which each link defines a bearing surface (3a) for the articles to be transported, each link (2) being articulated to an adjacent link (2) in the chain by means of a pin (8) and being pivotable relative to the adjacent link (2) by means of a sleeve (11) which has an axis (Y-Y) perpendicular to the bearing surface (3a) and is rotatable coaxially about a pivot (13) fitted on the pin (8) and comprising a plate-like head (17) extending through the link (2) to the level of the bearing surface (3a) and having a portion (18) shaped like a segment of a circle with a base (18b) extending in the direction of the width of the conveyor chain, and a portion (20) having a side (20a) adjacent the base (18b) of the circular-segment-shaped portion (18) and an opposite side (20b) which is concave and fits the circular-segment-shaped portion (18) of the plate-like head (17) of the pivot (13) of the adjacent link (2) in the chain.

6 Claims, 5 Drawing Sheets

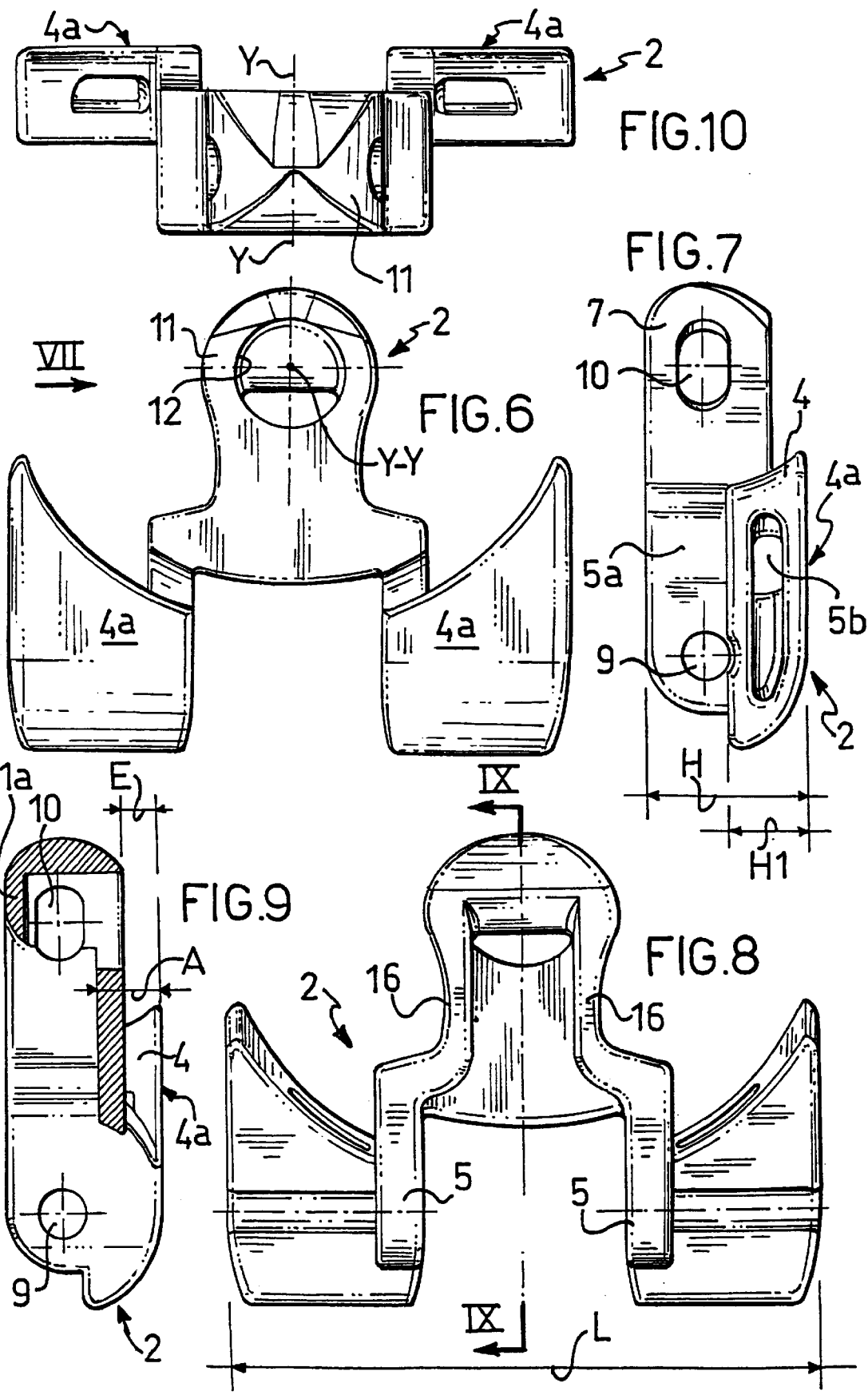

CONVEYOR CHAIN FOR TRANSPORTING ARTICLES

FIELD OF THE INVENTION

The present invention relates to a conveyor chain for transporting articles according to the preamble to the main claim.

BACKGROUND OF THE INVENTION

As is known, conveyor chains of the type specified have to satisfy the requirement to be wound around the drive pulley and the return pulley, to extend around bends connecting flat portions and rising portions, that is, to be able to bend backwards, so to speak, and, finally, to extend along flat portions including bends, that is, to be able to turn.

Although known conveyor chains are satisfactory from various points of view, are widely used, and substantially comply with the aforementioned requirements, they have the recognized disadvantage of a bearing surface which is rendered greatly discontinuous by numerous demarcation lines between adjacent portions, that is, in other words, a highly segmented bearing surface.

As a result, there is a danger that an operator's finger or flap of clothing may be caught, with the possibility of accidents.

The problem upon which the present invention is based is that of devising a conveyor chain which has structural and functional characteristics such as to overcome the disadvantage mentioned with reference to conveyor chains of the prior art.

SUMMARY OF THE INVENTION

This problem is solved by a conveyor chain according to the main claim.

BRIEF DESCRIPTION OF THE DRAWINGS

Further characteristics and the advantages of the conveyor chain according to the present invention will become clear from the following description of a preferred embodiment thereof, given by way of non-limiting example, with reference to the appended drawings, in which:

FIGS. 6, 7, 8, 9 and 10 are perpendicular views showing the detail of the conveyor chain of FIG. 5 in plan, from the side, from below, in lateral section and in a transverse view, respectively.

DETAILED DESCRIPTION OF THE PREFERRED EMBODIMENT

Figure 1:
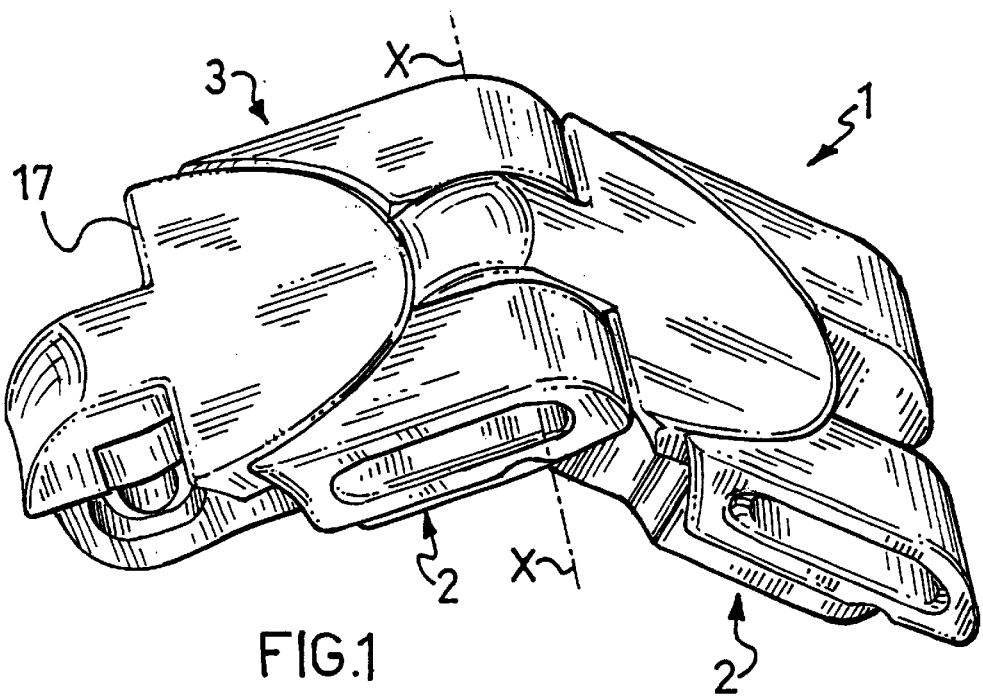
FIGS. 1, 2 and 3 are perspective views from above of a conveyor chain according to the present invention bent, bent backwards, and turning, respectively.
Figure 2:
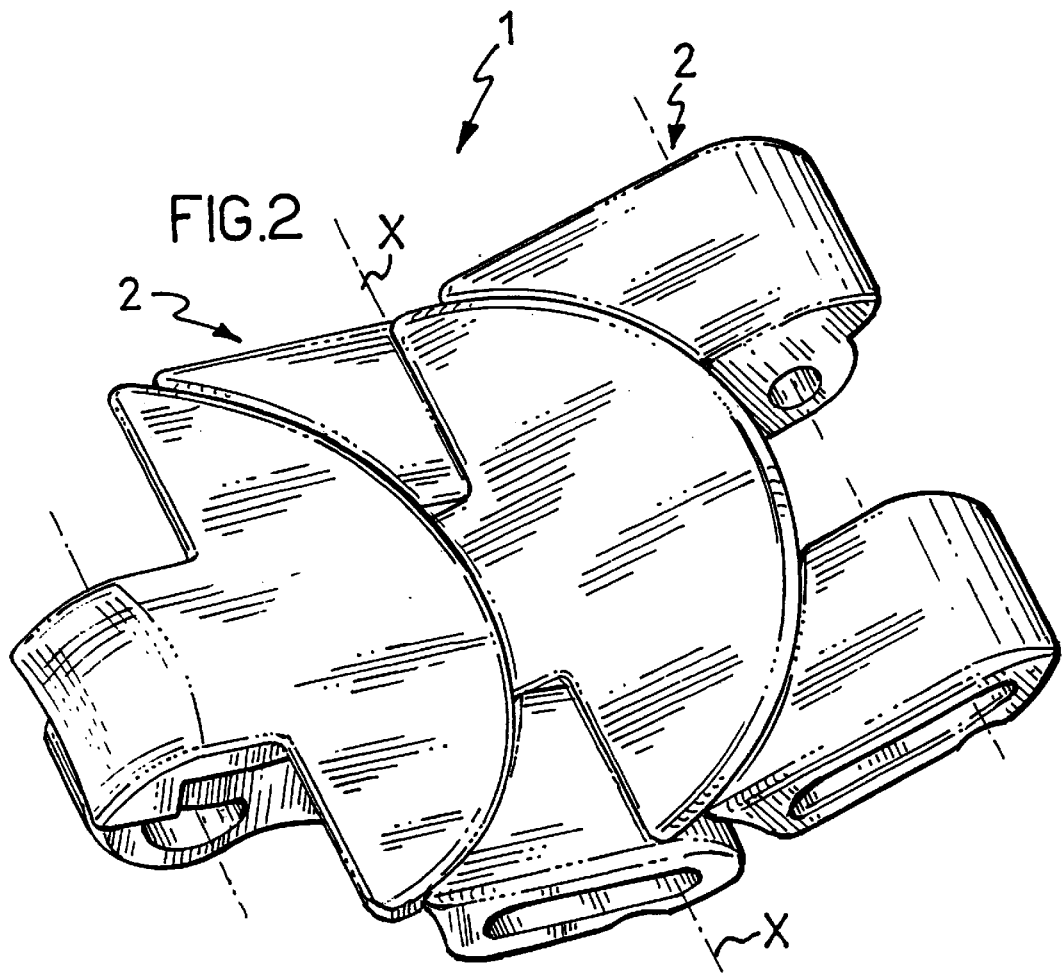
Figure 3:
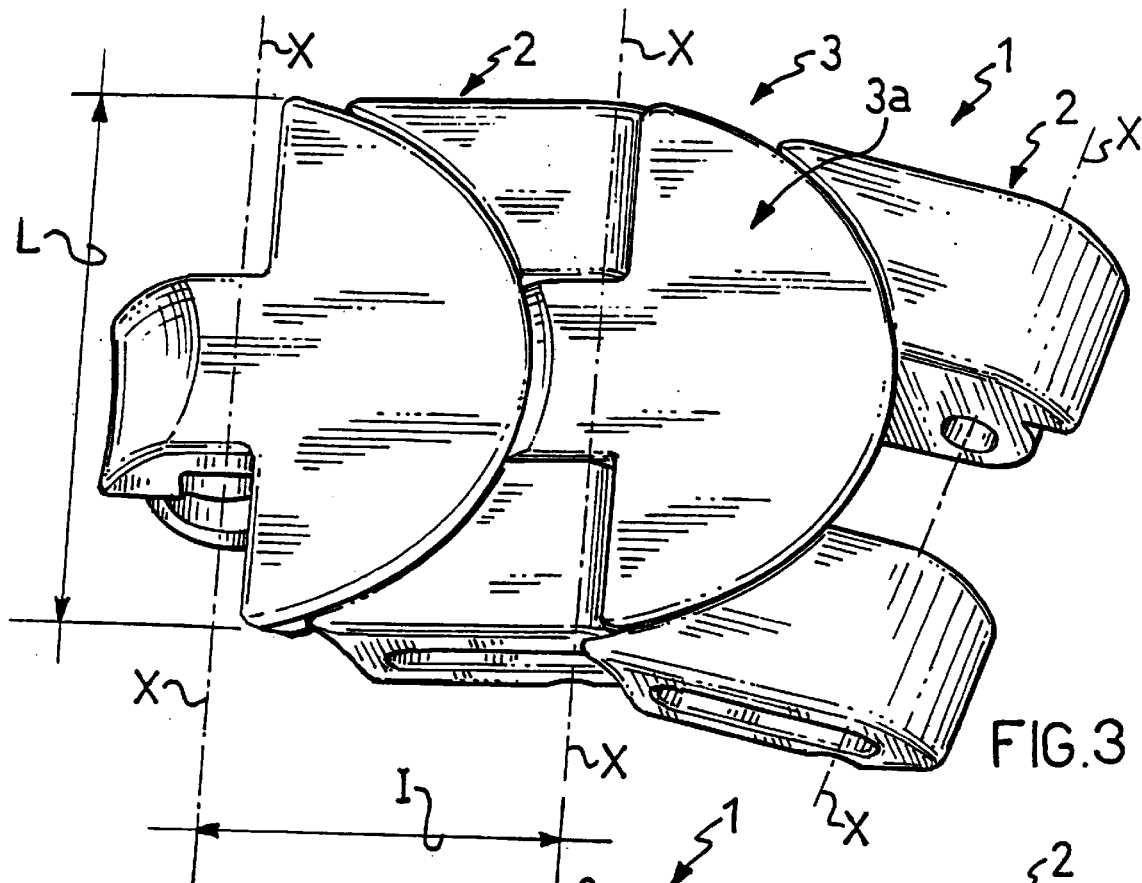
Figure 4:
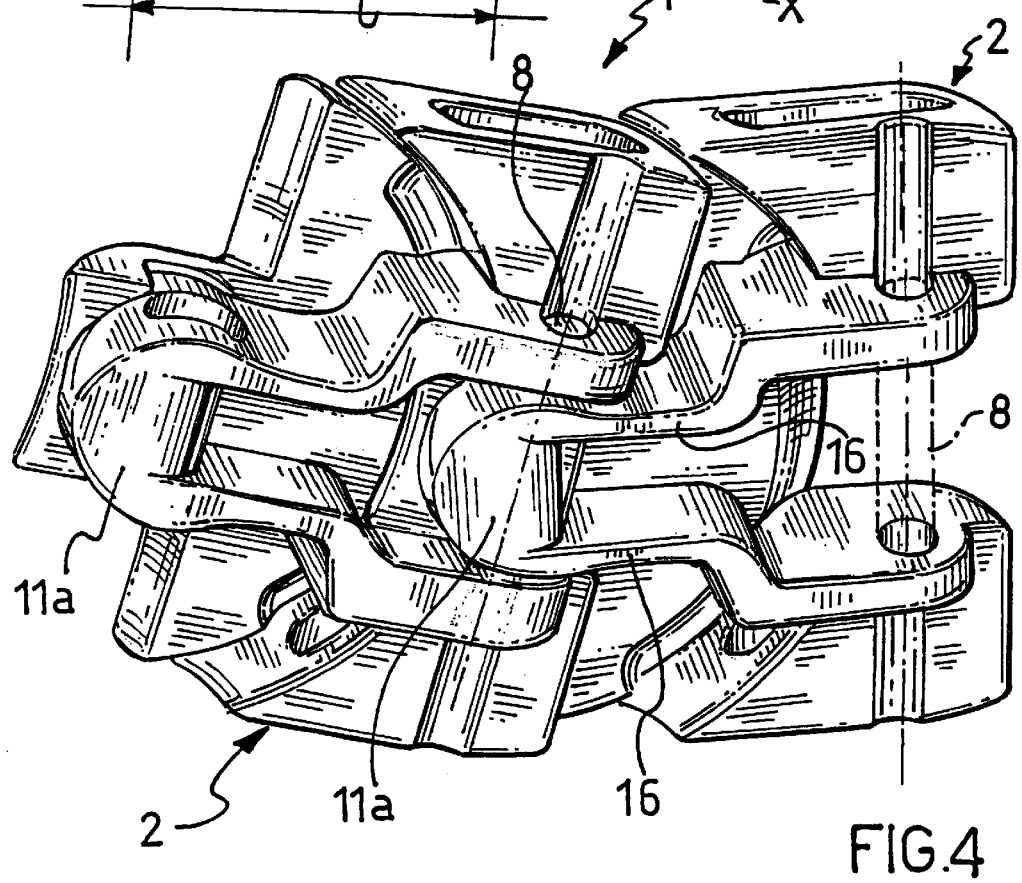
FIG. 4 is a perspective view of the conveyor chain of FIG. 3 from below.
Figure 5:
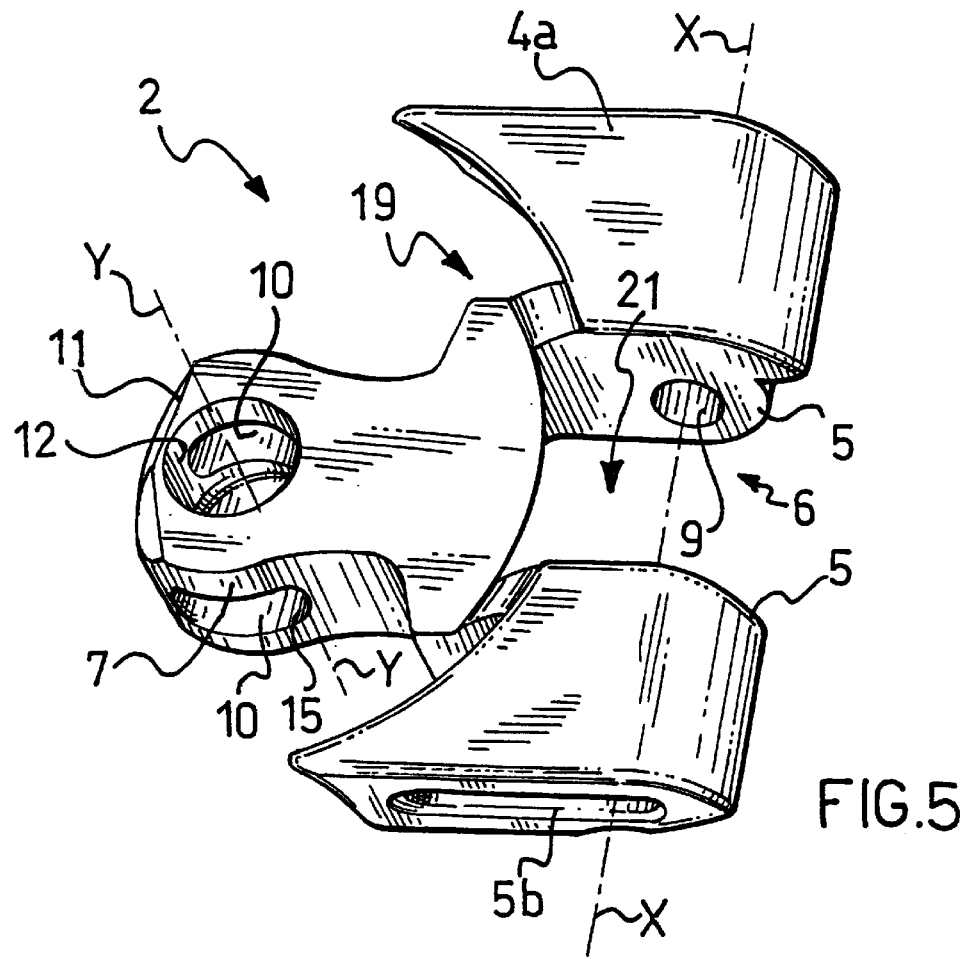
FIG. 5 is a perspective view of a detail of the conveyor chain of FIG. 1 from above.
Figure 11:
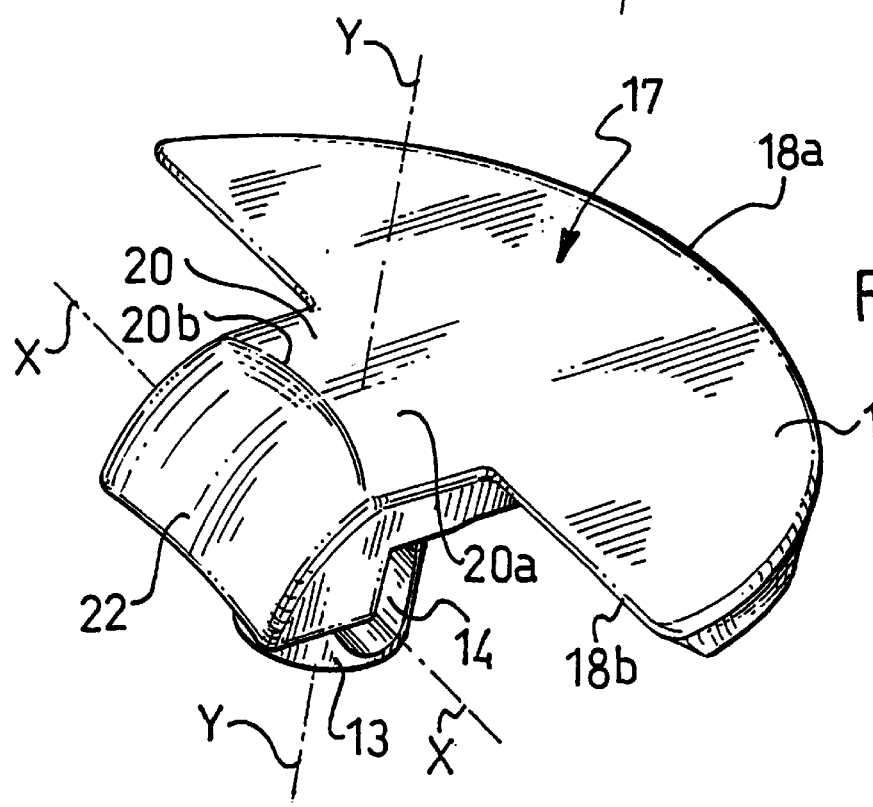
FIG. 11 is a perspective view of another detail of the conveyor chain of FIG. 1, from above.
Figure 16:
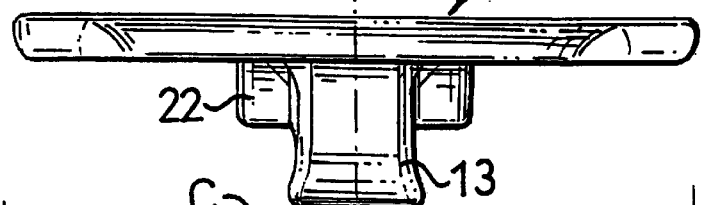
FIGS. 12, 13, 14, 15 and 16 are perpendicular views showing the detail of the conveyor chain of FIG. 11 in plan, in lateral section, from below, from the side and in a transverse view, respectively.
Figures 12, 13:
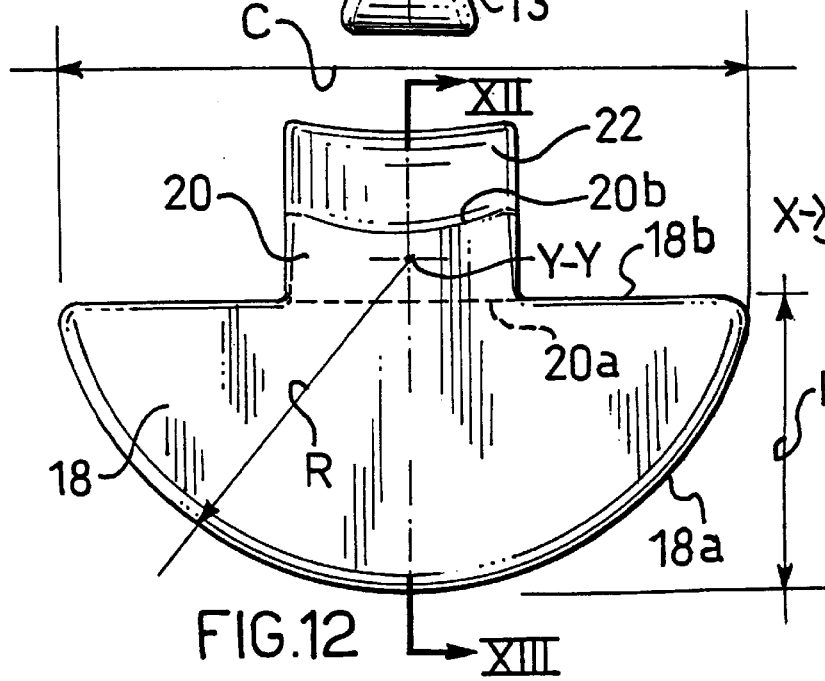
Figures 14, 15:
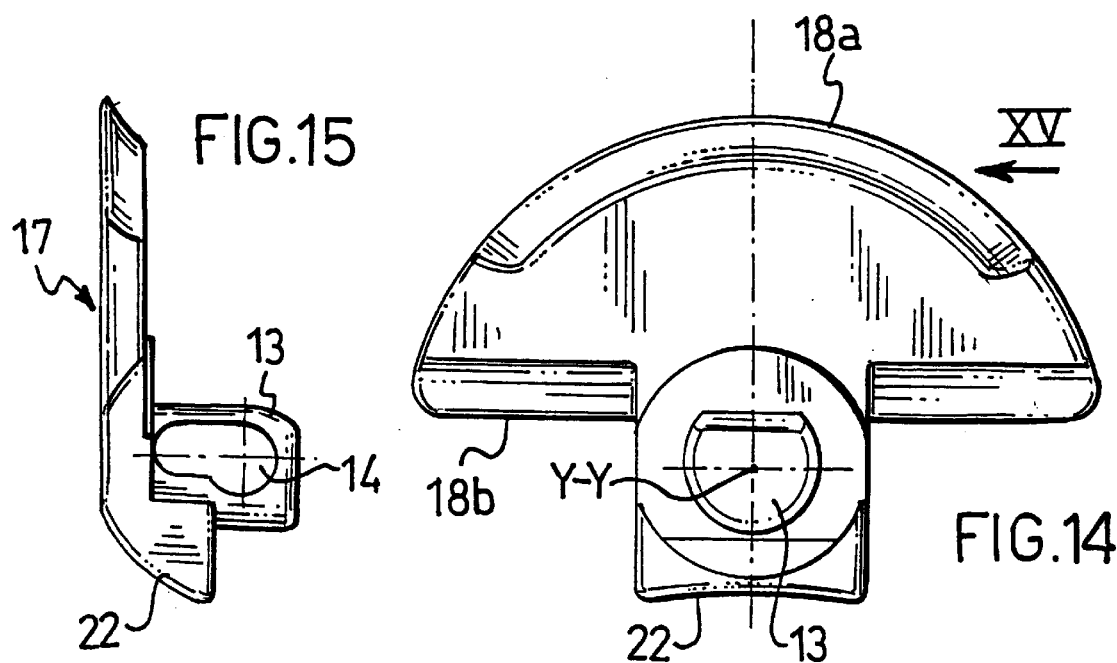

With reference to the appended drawings, a conveyor chain for transporting articles is generally indicated 1. The chain 1 has a predetermined width L, for example 83 mm, and comprises a plurality of links, all indicated 2.

A certain number of links 2 defines in the chain 1 an active pass 3 which has a useful flat bearing surface 3a for the articles to be transported. Each link 2 comprises a plate-like portion 4 of predetermined thickness, indicated A. The plate-like portion 4 offers an upper, flat bearing surface 4a for the articles to be transported, forming part of the surface 3a of the active pass.

Each link 2 has a width L and has, at its opposite ends in the direction of advance of the chain, on the one hand, two identical lateral eyes, both indicated 5, forming a fork 6 and, on the other hand, a central eye 7 to be inserted between the lateral eyes 5 of the adjacent link in the chain. The link 2 has a total thickness H.

Two adjacent links 2 of the chain are articulated to one another by means of a pin 8 with a transverse axis X-X parallel to the surface 4a. The pin 8 extends through the lateral eyes 5 and the central eye 7 which have holes 9 and 10, respectively, for this purpose.

An interaxial spacing or interval I of predetermined limited value in comparison with the width L is formed between the respective pins 8 in the conveyor chain 1. In the embodiment shown I equals 48 mm.

Each link 2 has, in the region of each lateral eye 5, a lower lateral recess 5a which reduces the thickness of the link locally to a limited thickness H1. Within this thickness H1, the lateral eyes 5 have respective slots 5b provided for reducing weight and for facilitating the production of the link by molding, particularly in order to avoid recesses due to shrinkage. The slots 5b are preferably through-slots, to facilitate cleaning thereof. It should be noted that, in addition to being articulated by means of a pin 8, adjacent links 2 are also pivotable relative to one another about an axis Y-Y perpendicular to the axis X-X of the pin 8 and perpendicular to the surface 4a.

For this purpose, the central eye 7 comprises a cylindrical sleeve 11 of axis Y-Y which has a coaxial cylindrical seat 12 housing a cylindrical pivot 13.

The hole 10, through which the pin 8 extends, is constituted by a cylindrical hole 14 formed transversely in the pivot 13 and by slotted holes 15 formed in the sleeve 11.

Two strong ribs 16 together forming a V-shape connect the sleeve 11 of the central eye 7 to the lateral eyes 5.

Each link 2 has, in the sleeve 11, a base wall 11a which strengthens the sleeve and closes it at the bottom.

The plate-like portion 4, the central eye 7, the lateral eyes 5, the sleeve 11 with the base wall 11a, and the ribs 16 constitute a monolithic element preferably produced by injection moulding of a plastics material.

The pivot 13 comprises a plate-like head, generally indicated 17 and having a flat top surface 17a. The plate-like head 17 extends through the plate-like portion 4 of the link 2 so that the top surface 17a is at the level of the bearing surface 4a. The top surface 17a and the bearing surface 4a are thus coplanar and contribute to the formation of the bearing surface 3a of the active pass 3 of the conveyor chain 1.

The plate-like head 17 preferably comprises a portion 18 shaped like a segment of a circle of predetermined radius R, centered on the axis Y-Y. The circular-segment-shaped portion 18 has an arcuate periphery 18a and a base 18b having a length C extending in the direction of the width of the chain and substantially equal to the width L of the chain, the height F of the segment being equal to approximately five sixths of the radius R.

The circular-segment-shaped portion 18 has a thickness B slightly less than the thickness A and is housed in a seat 19 formed in the plate-like portion 4 of the link, the seat 19 also being of an arcuate shape with a radius R equal to the radius of the circular-segment-shaped portion 18 and a depth E equal to the thickness B.

The plate-like head 17 preferably further comprises a portion 20 coplanar with the circular-segment-shaped portion 18 and having a side 20a adjacent the base 18b of the circular-segment-shaped portion and fitted with limited clearance in a seat 21 formed in the plate-like portion 4 of the adjacent link.

The portion 20 has a free side 20b opposite the side 20a. The free side 20b is concave and, for the sake of accuracy, has an arcuate shape of radius R facing and fitting the periphery 18a of the circular-segment-shaped portion 18 of the plate-like head 17 of the pivot 13 of the adjacent link in the chain.

The portion 20 comprises a inclined surface 22 in the free concave side 20b.

The inclined surface 22 has the shape of an arc of revolution, the axis of which coincides with the axis X-X of the pin 8. The inclined surface 22 faces and fits the periphery 18a of the circular-segment-shaped portion 18.

The pivot 13, the circular-segment-shaped portion 18, and the portion 20 with the inclined surface 22 constitute a single monolithic element, preferably produced by injection moulding of a plastics material.

In the conveyor chain 1, bearing surfaces 4a of the links and coplanar bearing surfaces 17a of the plate-like heads are arranged in succession in the useful bearing surface 3a for the articles to be transported.

In operation, the continuity of the useful bearing surface 3a of the conveyor chain is kept substantially intact. In fact, when pivoting takes place between adjacent links, one link pivots about the circular-segment-shaped portion 18 without opening up undesired spaces. When articulation takes place between adjacent links, each link 2 pivots about the axis X-X of the pin 8 relative to the portion 20 of the plate-like head 17 of the pivot 13. The inclined surface 22 prevents undesired holes from forming in the useful surface.

It is important to note that, along the conveyor chain according to the present invention, in the bearing surface 3a and, more precisely, in a central region thereof, the bearing surface 3a comprises an unbroken series of plate-like heads 17 such that the continuity of the bearing surface is interrupted only once per link, with the great advantage the articles are transported uniformly in the region of the periphery 18a and of the concave side 20b which face one another and fit together. The main advantage of the conveyor chain according to the present invention therefore lies in its exceptional functionality which is due mainly to the fact that it has an unusually continuous bearing surface. This advantage is combined with that of improved safety from the accident-prevention point of view.

A further advantage of the conveyor chain according to the present invention lies in its strength and reliability. In fact the pivot and its plate-like head can be constructed with strong cross-sections no smaller than the strong cross-sections of the link so as to ensure structural continuity of the chain and of its surface.

A further advantage of the conveyor chain according to the invention lies in the fact that it has a limited number of different parts, that is: the link and the pivot, naturally as well as the pin. This results in clear advantages with regard to structural simplicity and reliability.

A further advantage of the chain according to the present invention lies in its small thickness. The plate-like head is in fact housed within the thickness A of the plate-like portion of the respective link without increasing the total thickness H of the link.

Finally, a further advantage of the chain according to the present invention lies in the fact that it is of light weight and has unusually uniform surfaces without recesses due to shrinkage.

Naturally, in order to satisfy contingent and specific requirements, an expert in the art may apply to the embodiment of the conveyor chain described above with reference to the appended drawings many modifications and variations all of which, however, are included within the scope of protection of the invention as defined by the following claims.

We claim:

1. A conveyor chain (1) for transporting articles, of the type comprising a plurality of links (2), in which each link (2) defines a bearing surface (3a) for the articles to be transported, each link (2) being articulated to an adjacent link (2) in the chain by means of a pin (8) which has a predetermined axis (X-X) and extends through a central eye (7) of the link (2) and lateral eyes (5) of an adjacent link (2), and each link (2) being pivotable relative to the adjacent link (2) by means of a sleeve (11) which has an axis (Y-Y) perpendicular to the bearing surface (3a) and is rotatable coaxially about a pivot (13) fitted on the pin (8) and comprising a plate-like head (17) extending through the link (2) to the level of the bearing surface (3a) and having a portion (18) shaped like a segment of a circle with a base (18b) extending in the direction of the width of the conveyor chain (1), characterized in that the plate-like head (17) comprises a portion (20) having a side (20a) adjacent the base (18b) of the circular-segment-shaped portion (18) and an opposite side (20b) which is concave and fits the circular-segment-shaped portion (18) of the plate-like head (17) of the pivot (13) of the adjacent link (2) in the chain.

2. A conveyor chain (1) according to claim 1, characterized in that the portion (20) of the plate-like head (17) has an inclined surface (22) formed on the concave side (20b).

3. A conveyor chain (1) according to claim 2, characterized in that the inclined surface (22) has the shape of a concave arc of revolution the axis of which coincides with the axis (X-X) of the pin (8).

4. A conveyor chain (1) according to claim 1, characterized in that the lateral eyes (5) of each link (2) have respective slots (5b) for reducing weight.

5. A conveyor chain (1) according to claim 4, characterized in that the slots (5b) are through-slots.

6. A conveyor chain (1) according to claim 1, characterized in that the sleeve (11) is defined by a strengthening base wall (11a).

* * * * *